US007219777B2

(12) United States Patent
Lin

(10) Patent No.: US 7,219,777 B2
(45) Date of Patent: May 22, 2007

(54) REINFORCED BRAKE ROTOR

(76) Inventor: Warren Lin, 14 Daro Ct., Montville, NJ (US) 07045

(*) Notice: Subject to any disclaimer, the term of this patent is extended or adjusted under 35 U.S.C. 154(b) by 0 days.

(21) Appl. No.: 10/665,040

(22) Filed: Sep. 18, 2003

(65) Prior Publication Data

US 2004/0200675 A1 Oct. 14, 2004

Related U.S. Application Data

(60) Provisional application No. 60/466,609, filed on Apr. 30, 2003, provisional application No. 60/462,110, filed on Apr. 11, 2003.

(51) Int. Cl.
*F16D 65/12* (2006.01)

(52) U.S. Cl. ........................ 188/218 XL; 188/264 AA

(58) Field of Classification Search ........... 188/218 R, 188/218 XL, 264 A, 264 AA
See application file for complete search history.

(56) References Cited

U.S. PATENT DOCUMENTS

| | | | | |
|---|---|---|---|---|
| 2,869,688 | A * | 1/1959 | Busch | 188/218 XL |
| 3,002,595 | A | 10/1961 | Weir | 192/58 |
| 3,809,192 | A * | 5/1974 | Stehle | 188/218 XL |
| 4,263,992 | A * | 4/1981 | Moore et al. | 188/218 XL |
| 4,913,266 | A * | 4/1990 | Russell et al. | 188/18 A |
| 6,035,978 | A * | 3/2000 | Metzen et al. | 188/218 XL |
| 6,161,660 | A * | 12/2000 | Suga et al. | 188/218 XL |
| 6,260,669 | B1 * | 7/2001 | Daudi | 188/71.6 |
| 6,308,808 | B1 | 10/2001 | Krenkel et al. | 188/218 XL |
| 6,334,515 | B1 | 1/2002 | Martin | 188/218 XL |
| 6,347,691 | B1 | 2/2002 | Aydt | 188/218 XL |
| 6,367,598 | B1 * | 4/2002 | Sporzynski | 188/218 XL |
| 6,386,341 | B1 | 5/2002 | Martin | 188/218 XL |
| 6,405,657 | B1 * | 6/2002 | Polley | 105/194 |
| 6,422,358 | B2 | 7/2002 | Deibel | 188/218 XL |
| 6,467,590 | B2 | 10/2002 | Aydt | 188/218 XL |
| 6,536,564 | B1 * | 3/2003 | Garfinkel et al. | 188/264 A |
| 6,568,512 | B1 * | 5/2003 | Tolani | 188/218 XL |
| 2001/0040077 | A1 | 11/2001 | Qian et al. | 188/218 XL |
| 2002/0027049 | A1 | 3/2002 | Aydt | 188/218 XL |
| 2002/0153213 | A1 | 10/2002 | Gruber et al. | 188/218 XL |
| 2003/0034213 | A1 | 2/2003 | Qian et al. | 188/218 XL |

FOREIGN PATENT DOCUMENTS

| | | |
|---|---|---|
| DE | 3216108 A1 * | 12/1982 |
| JP | 3333 A * | 1/1991 |

* cited by examiner

*Primary Examiner*—Melody M. Burch
(74) *Attorney, Agent, or Firm*—Michael I. Kroll

(57) ABSTRACT

Some embodiments of the present invention are directed to a brake rotor which may include a central mounting portion for mounting the brake rotor on a hub, a first annular braking surface and a second annular braking surface, where each braking surface includes an inner diameter and an outer diameter, a bridge provided between the central mounting portion and the inner diameter of at least one of the first and the annular braking surfaces and a plurality of ribs positioned proximate to the bridge.

11 Claims, 10 Drawing Sheets

203
204a
206
202A
212
201
208
212
214
215

203
202b
215
201
204b
200
214
216
216

216a
216a
216a 316
316
316

306
302a
301
312
308
303a
315
315

315
302b
301
315
303b
312

REINFORCED BRAKE ROTOR

PRIORITY

The present invention claims priority under 35 U.S.C. §119(e) of U.S. provisional patent application Nos. 60/462,110, filed Apr. 11, 2003, and 60/466,609, filed Apr. 30, 2003, each disclosure of which, in its entirety, is herein incorporated by reference. The present invention is related to co-pending and co-owned patent application Ser. No. 10/608,246, filed Jun. 27, 2003, the disclosure of which, in its entirety, is also herein incorporated by reference.

FIELD OF THE PRESENT INVENTION

Embodiments of the present invention are directed toward novel brake rotor designs for use with any disc braking system including those of motor vehicles, and methods of manufacturing the same.

BACKGROUND OF THE INVENTION

Generally, existing brake rotors include solid, non-venting rotor designs and venting designs, as disclosed in U.S. Pat. No. 5,878,848. Accordingly, conventional ventilated brake rotors generally include a pair of mutually spaced-apart annular disks that present two opposed external braking surfaces for engaging brake pads under a clamping operation of a braking actuator (brake caliper). The space between the disks typically includes a number of vanes with flow passages defined between each pair of adjacent vanes that extend between the disks from a braking surface inner diameter to the outer diameter. Rotation of the rotor causes the vanes to induce air flow through the flow passages from the inner diameter to the outer diameter of the braking surfaces, providing increased convective heat transfer from the rotor. Inlets for the vanes reside near the central portion of the rotor.

Ever since the advent of the automobile, automotive enthusiasts have customized their vehicles for both aesthetic and performance reasons. Typically, in the case of braking performance upgrades, enthusiasts would do such things as add braking pads of exotic material compositions. However, such an upgrade usually would not significantly improve braking performance, and is most likely unnoticeable to the average automotive enthusiast.

Accordingly, in order to increase braking performance to a noticeable degree, enthusiasts usually replace existing disc brake rotors with larger (i.e., increased diameter) rotors. These increased diameter brake rotors include larger annular braking surfaces, specifically including larger braking surface widths (i.e., distance between the inner diameter of the braking surface and the outer diameter of the braking surface) than the original. equipment (OE) brake rotors.

The problem with replacing the OE brake rotors with larger diameter brake rotors is that many of the components of the OE brake system now also need to be replaced. For example, the OE calipers, pads and associated hardware cannot be used in combination with the new larger diameter rotors. Thus, to provided a noticeable increase in brake performance, almost the entire braking system at each wheel location having an increased diameter rotor must be replaced. Accordingly, such an undertaking can become complicated and expensive.

Moreover, in using disc brake rotors having increased diameters, they are subject to increased stresses which may cause premature failure (e.g., warping). This is the general reason why most passenger vehicles lack large rotors, and automotive system designers instead focus on the development of exotic materials for brake rotors and brake pads to increase braking performance. Thus, there exists a need for stable and durable larger brake rotors to increase braking performance, and also for a means for increasing brake system performance without having to substantially modify the entire existing brake system.

SUMMARY OF THE INVENTION

The present invention presents new rotor designs, devices, systems and methods for increasing the durability and braking performance of disc brake systems and their associated parts. Specifically, in certain embodiments of the present invention, a brake rotor having a plurality of reinforcing ribs is provided. The ribs may be used to stabilize the rotor and allow for a less massive rotor (weight wise for example) to be used.

Such embodiments also address the problem of increased stress on larger diameter disc brake rotors by including reinforcing ribs to stabilize the areas of the disc which are subject to the increased stresses, for example.

Accordingly, in one embodiment of the invention, a brake rotor may include a central mounting portion for mounting the brake rotor onto a hub, a first annular braking surface and a second annular braking surface, where each braking surface includes an inner diameter and an outer diameter, a bridge provided between the central mounting portion and the inner diameter of at least one of the first and the annular braking surfaces and a plurality of ribs positioned proximate to the bridge.

In another embodiment of the invention, a brake rotor may include a central mounting portion for mounting the brake rotor onto a hub, a first annular braking surface and a second annular braking surface, where each braking surface includes an inner diameter and an outer diameter, a plurality of flow channels provided between the first annular braking surface and the second annular braking surface, a bridge provided between the central mounting portion and the inner diameter of at least one of the first and the annular braking surfaces and a plurality of ribs positioned proximate to the bridge.

In yet another embodiment of the present invention, a braking system is provided and may include a caliper, a brake rotor and a pair of braking pads. The brake rotor may include a central mounting portion for mounting the brake rotor on a hub, a first annular braking surface and a second annular braking surface, where each braking surface includes an inner diameter and an outer diameter, a bridge provided between the central mounting portion and the inner diameter of at least one of the first and the annular braking surfaces and a plurality of ribs positioned proximate to the bridge. This embodiment may also be used in combination with a vehicle.

In still yet another embodiment, a cover for a bridge portion of a brake rotor is provided. The cover includes a flange for mounting and covering a portion or all of at least the bridge portion of a rotor. The cover may include a plurality of openings for receiving a fastener, which is then received by the rotor so that the cover is fastened adequately (e.g., securely) to the rotor. Of course, the mounting holes are optional, as any mounting means familiar to one of skill in the art may be used.

Other embodiments of the present invention may include any vehicle and motor vehicle (e.g., automobile, plane, train, bus, truck, and the like) having one more brake rotors according to one or more of the above embodiments.

These and other embodiments, objects and advantage of the present invention will become even more clearer, with reference to the figures for the present invention, a brief description of each figure is set out below, and accompanying detailed description.

BRIEF DESCRIPTIONS OF THE DRAWINGS

DETAILED DESCRIPTION OF THE EMBODIMENTS

Figures 1A, 1B:
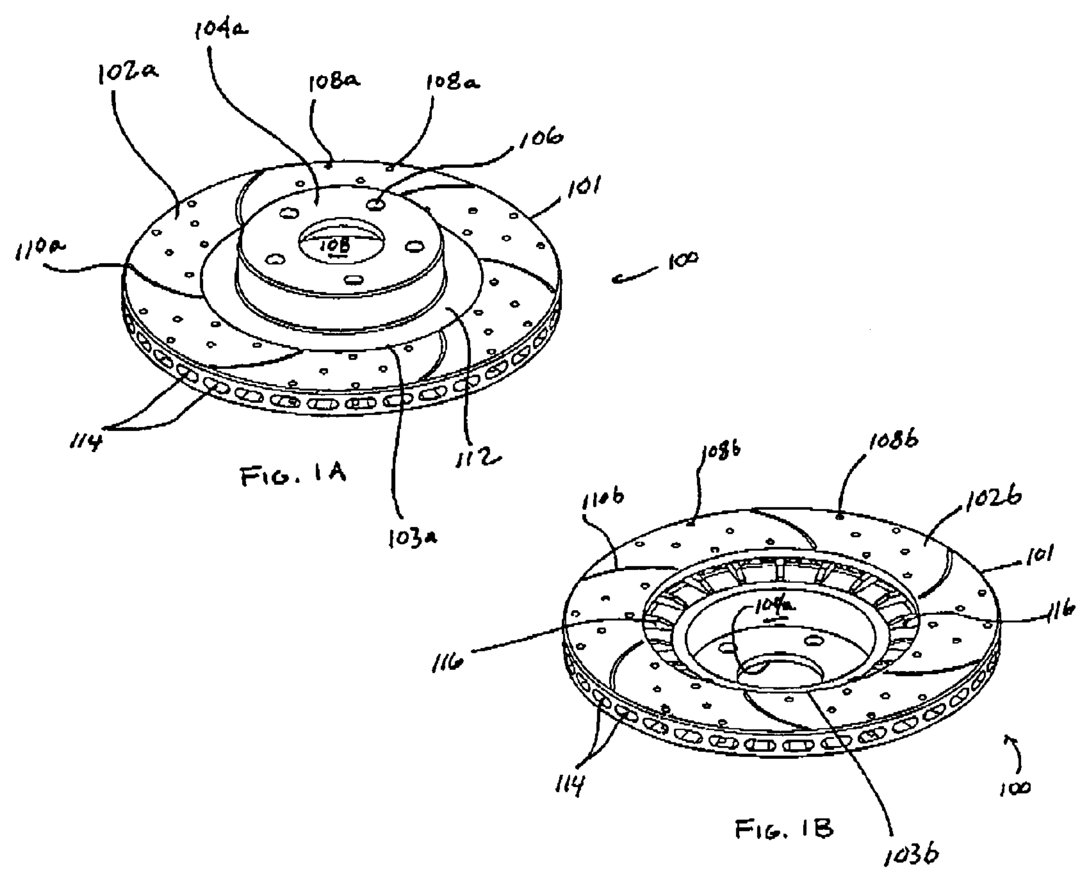
FIG. 1A illustrates a top, perspective view according to one embodiment of the present invention.
FIG. 1B illustrates a bottom, perspective view according to the embodiment of the invention illustrated in FIG. 1A.
Figure 1C:
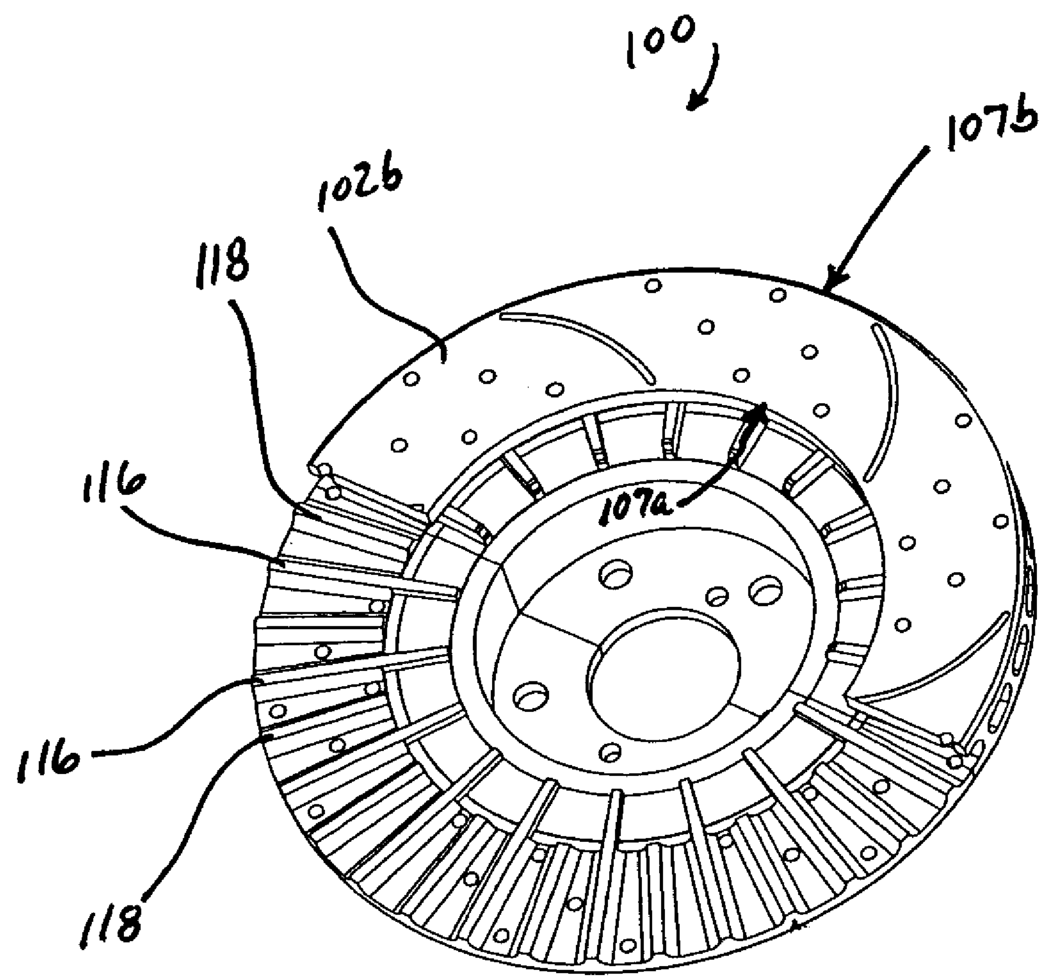
FIG. 1C illustrates a bottom, perspective, cut-away view of the embodiment of the invention illustrated in FIGS. 1A and 1B.

FIGS. 1A–1C illustrate one embodiment of the present invention. As shown, a disc brake rotor 100 includes an outer diameter 101, which is also the outer diameter of the outboard braking surface 102*a* and the outer diameter of the inboard braking surface 102*b*. Each braking surface also includes a respective inner diameter: inner diameter 103*a* with respect to braking surface 102*a* and inner diameter 103*b* with respect to braking surface 102*b*. The depth/width of each braking surface is illustrated by arrows 107*a* and 107*b* (see FIG. 1C).

Central to the brake rotor is a mounting portion 104, having an inner "bottom" surface 104*a*. The mounting portion may be a hat (as illustrated), or may contain a series of mounting holes or fasteners for mounting the rotor to a hub (i.e., a "hat-less" rotor). As illustrated, the hat included with the present embodiment includes a central opening 108 for receiving a central portion of a hub of a vehicle, and openings 106 for receiving (typically, but not exclusively) fasteners from the hub, for fastening a wheel to the rotor/hub assembly. One of skill in the art will appreciate that the rotor may include the fasteners instead of the hub.

The braking surfaces may also include slots 110*a*, 110*b*, as well as openings 108*a*, 108*b*. Such openings may be connected (e.g., cross-drilling), to communicate gases, for example, between braking surfaces. In the case of a vented rotor, as shown, the openings generally allow communication between the braking surface and one or more flow channels 114 located between the braking surfaces.

Between the braking surfaces and the central mounting portion, one or more reinforcing ribs (e.g., long ribs 116 and short ribs 118) may be positioned on a lower portion 112*a* of a bridge area 112. The bridge area may be an area of the rotor that typically is subjected to increased stresses (e.g., during braking). This is especially true for a brake rotor having an increased diameter. Thus, the ribs included in some embodiments of the invention add reinforcement to the bridge portion of the rotor thereby decreasing the possibility of rotor warpage. Such ribs also may be applied to both existing (current and prior art) brake rotor designs.

As seen in FIG. 1C reinforcing ribs 116 extend from bridge area 112 into the space between braking surfaces 102*a* and 102*b* to the outer end 107*b* of said braking surfaces and between reinforcing ribs 118, said reinforcing ribs 118 being limited to the width of braking 102*a* and 102*b* between 107*a* and 107*b*.

The ribs may be formed of the same material as the rotor (preferably) and may include a thickness (for example) of between 0.0625" and 1" or more, depending upon the size of the bridge portion and/or overall disc diameter, and is preferably between about 0.10" and 0.50". Moreover, the ribs may protrude above/below a surface of the bridge portion by up to approximately one (1) inch and greater, depending once again on rotor design.

Thus, in some embodiments of the present invention, a disc brake rotor having substantially the same diameter as an original-equipment rotor is presented, but including one or more reinforcement ribs on the bridge portion. The reinforcing ribs may be provided on the inboard side of the brake rotor and preferably, a plurality of ribs are positioned along the inboard portion of the bridge, equally spaced apart from one another for both superior support and rotor balancing reasons.

In still other embodiments of the invention, brake rotors having the same braking surface widths (e.g., 107*a*, 107*b*) as, for example, an OE rotor, but having an overall increased brake rotor diameter to provide increased braking performance are provided. Since the width of the braking surfaces remain essentially the same, the increased diameter rotors may retain the ability to be used with the existing braking system (e.g., the caliper) used with the prior rotor. Depending upon the size of the larger diameter brake rotor used, a caliper extension bracket (or other such extension device or member) may be required so that the existing caliper may be used with the new rotor. Such extension brackets include two mounting portions: a first mounting portion for mounting the bracket to the fastening location where the caliper was originally mounted, and a second mounting portion spaced apart from the first mounting portion where the caliper will be fastened and repositioned.

The existing type of caliper and braking pad may also be used with the new rotor, however, a multi-port caliper and larger (longer) brake pad covering a greater amount of braking surface area may also be used to further increase performance. Such a new brake pad would preferably include a width corresponding to the width of the braking surfaces of the rotor.

The larger diameter rotors improve upon braking performance in at least two different respects. For example, the force required to be placed against the braking surfaces by the brake pad when using the larger brake rotor is less since there is now a longer moment arm as compared to a rotor of smaller diameter.

Secondly, although the contact area between each OE type pad and the larger rotor may remain substantially the same, the total pad sweeping area is increased relative to each revolution of the brake rotor due to the increased diameter. Specifically, per each revolution of the brake rotor, more surface area of the braking surfaces interacts with a respective brake pad. Thus, stopping distances decrease.

The bridge portions of the embodiments of the invention may be between less than 0.25 inch to about 1.00 inch on prior art rotors, but may be stretched to greater than 1.00 inch for example (e.g., up to 2.00 inches or greater) on the extended diameter brake rotor embodiments of the present invention.

Another advantage of certain embodiments of the present invention is that the reinforcing ribs compensate for the increased forces produced as a result of the use of a larger rotor and pad combination (for example), while not adding additional weight to the rotor as may be had when, for example, strengthening the bridge portion by increasing the thickness of the bridge portion material. This weight savings for the rotor allows the rotors to be manufactured more economically and also may improve vehicle handling. Specifically, unsprung weight in a vehicle degrade the handling characteristics of a vehicle. The more the tire, wheel, rotor/caliper, and hub combination weigh, the more it affects the handling of the vehicle. Thus, by providing reinforcing ribs instead of, say, making the bridge portion of a thicker material, the less the rotor will weigh because of material savings and less unsprung weight of the vehicle.

Figures 2A, 2B:
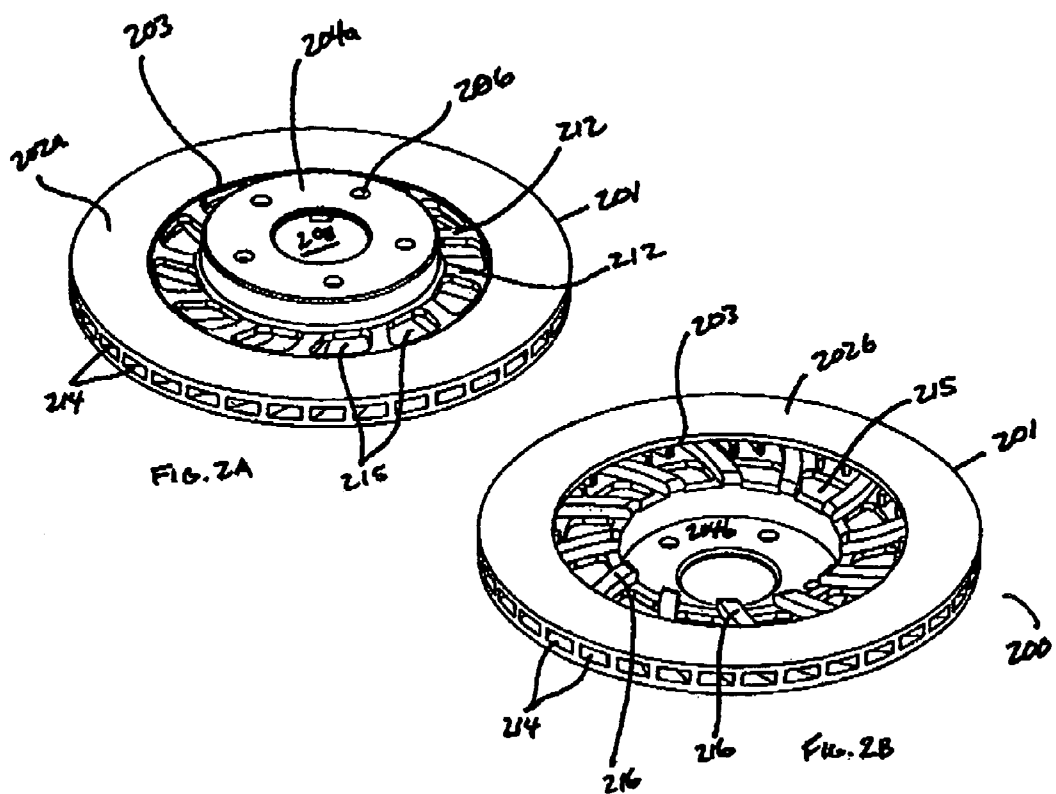
FIG. 2A illustrates a top, perspective view according to another embodiment of the present invention.
FIG. 2B illustrates a bottom, perspective view according to the embodiment of the invention illustrated in FIG. 2A.
Figure 2C:
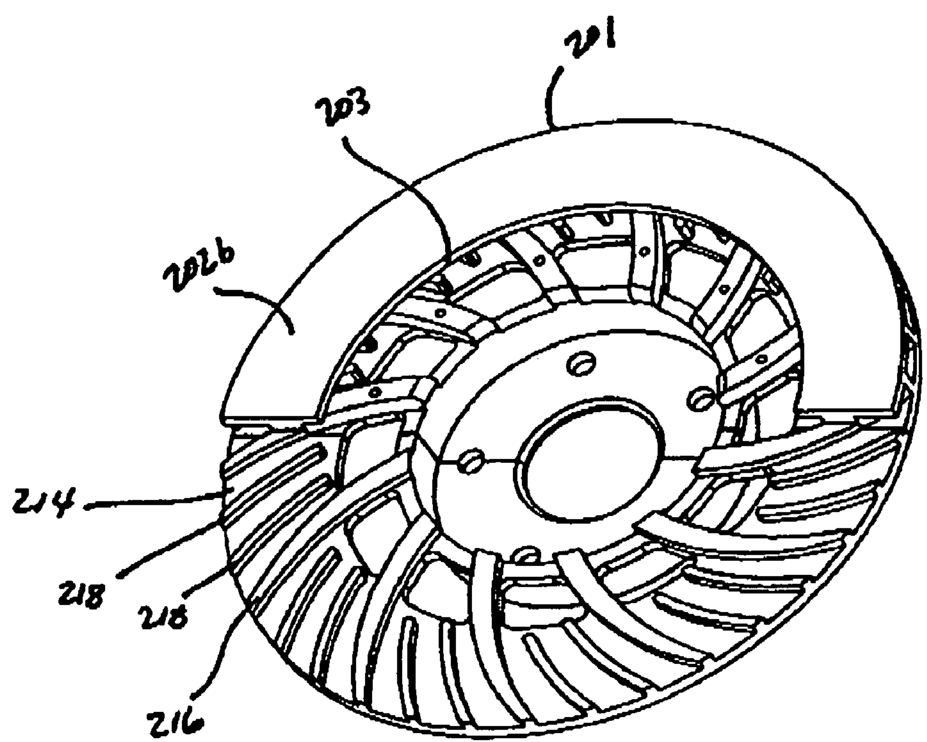
FIG. 2C illustrates a bottom, perspective, cut-away view of the embodiment of the invention illustrated in FIGS. 2A and 2B.
Figures 3A, 3B:
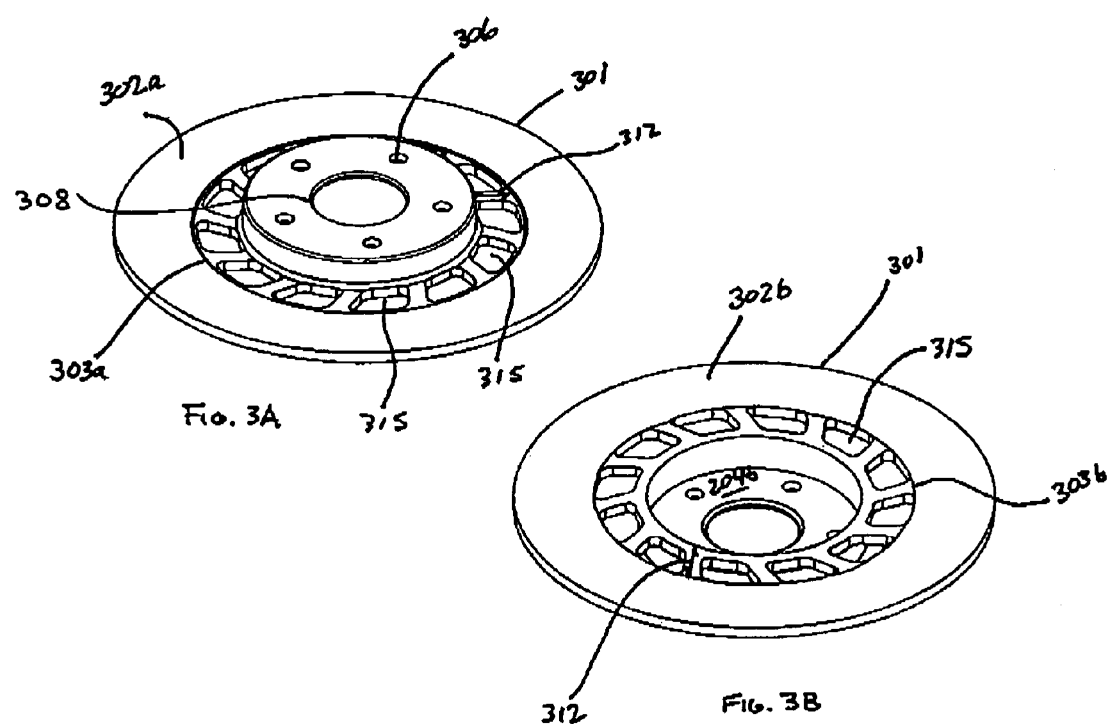
FIG. 3A illustrates a top, perspective view according to yet another embodiment of the present invention.
FIG. 3B illustrates a bottom, perspective view according to the embodiment of the invention illustrated in FIG. 3A.
Figure 3C:
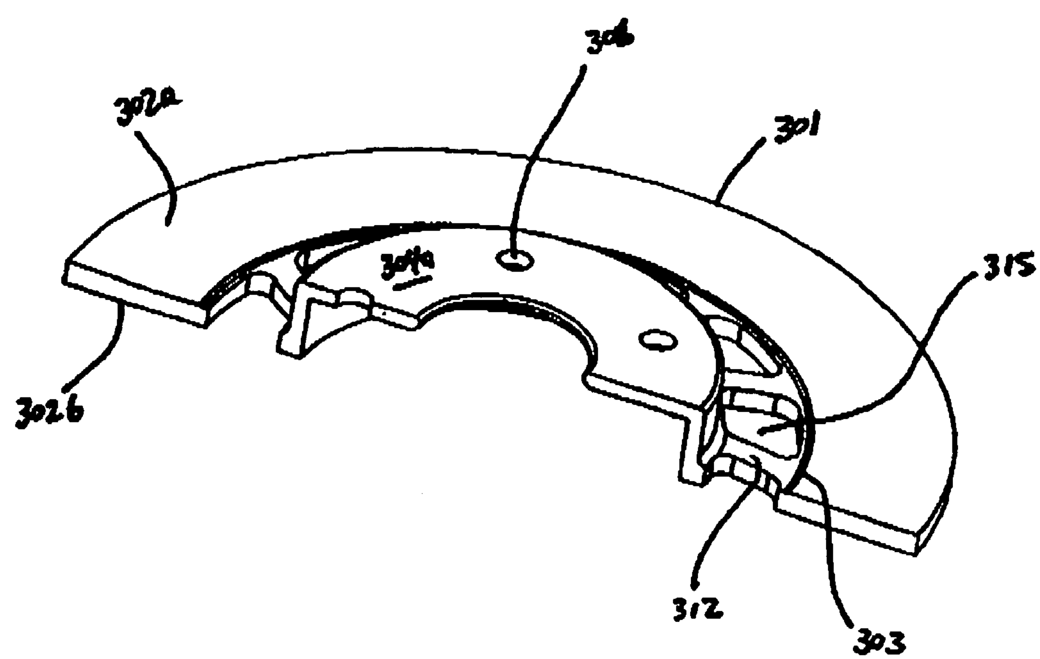
FIG. 3C illustrates a bottom, perspective, cut-away view of the embodiment of the invention illustrated in FIGS. 3A and 3B.

Additional weight savings may also be provided by including a plurality of openings between one or more pairs of ribs, as shown in the vented rotor design illustrated FIGS. 2A–2C, or in general as shown in the non-vented rotor design illustrated in FIGS. 3A–3C. Accordingly, as shown in FIGS. 2A–2C, a rotor 200 having vents 214 and includes a first (outer) braking surface 202*a* and a second (inner) braking surface 202*b*. Inner diameter 203 may be the boundary for each braking surface, while outer diameter 201 may be the outer diameter of not only the rotor in general but the braking surfaces as well. Such embodiments give the appearance of “spokes” in the bridge portion of the rotor.

In such “spoked” brake rotors with spokes, performance may also be increased due to less heat traveling from the braking surfaces to, for example, the hat, for two reasons. First, there is less connected material for which the heat can be transferred direct to and, second, the openings increase the area in dissipating the heat to the surrounding air.

Figures 2D, 3D:
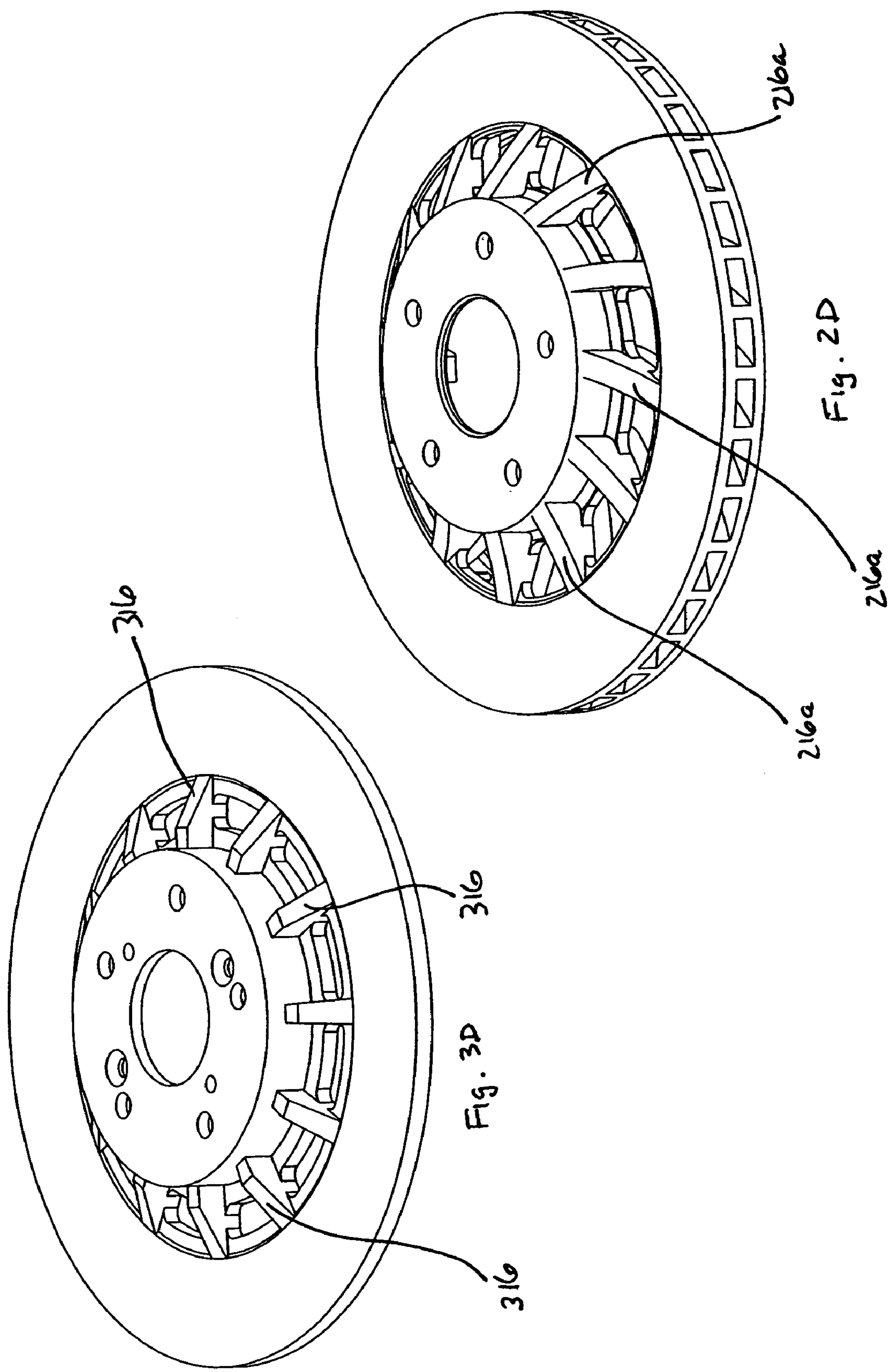
FIG. 2D illustrates a perspective view of a solid brake rotor having reinforcing ribs extending in an outboard direction according to an embodiment of the present invention.
FIG. 3D illustrates a perspective view of a vented brake rotor having reinforcing ribs extending in an outboard direction according to an embodiment of the present invention.

Central mounting portion includes a hat 204*a* having corresponding bottom inner surface 204*b*. Fastener openings 206 are provided on the hat for receiving a fastener of a hub (so that a wheel may be attached to the rotor/hub combination). Opening 208 is provided for receiving the center of the hub. As also shown, a plurality of ribs (e.g., long ribs 216 and long rib 218) are included and are positioned proximate the lower, inboard surface of a bridge portion 212 (i.e., the portion of the rotor between the mounting portion/hat and the braking surfaces). However, as shown in FIG. 2D, one or more (or all) ribs may be formed on the outboard side of the brake rotor as well.

The ribs may also be formed in an airfoil design or other design which may produce additional airflow in and/or around the bridge portion (and/or the rotor itself). Accordingly, such embodiments may increase the performance of the braking system since the effects of over-heating on the brake rotor may be lessened.

As shown in FIG. 2C, each rib may form a wall to one or more flow channels of the illustrated vented rotor. Moreover, the walls/ribs of the rotor may include a curved shape (or any shape/design) as opposed to the straight design illustrated in FIGS. 1A–1C.

Positioned between a pair of ribs (for example) is an opening 215. As previously stated, the opening decreases the weight of the rotor, thereby limiting the unsprung weight of the vehicle (relative to a similar rotor of the same proportions, but lacking openings 215). The openings may also increase the airflow properties of the rotor such that it may shed heat more quickly than prior art rotor designs.

Furthermore, the ribs as used in some embodiments of the present invention, may also perform as a cooling fin for the brake rotor. Specifically, the reinforcing ribs not only provide structural support and stability to the bridge portion and rotor as a whole, but they also increase the surface area of the rotor exposed to air that is surrounding the rotor. Thus, a rotor with reinforcing ribs according to the present invention will shed heat more quickly than prior art rotor designs.

The non-vented rotor according to embodiments of the present invention as illustrated in FIGS. 3A–3C includes outer diameter 301 includes a first outboard braking surface 302*a*, with inner diameter 303*a*, and a second inboard braking surface 302*b*, with inner diameter 303*b*. A central mounting portion 304*a* spaced apart from the braking portion by bridge 312, includes openings 306 for receiving threaded fasteners for mounting a wheel to the rotor, and central opening 308 for receiving a central area of the hub. The non-vented rotor may include one or more openings (preferably at least a pair of opposed openings for balance purposes) 315.

The non-vented rotor may include ribs 316 which may protrude above the surface of the bridge portion on either the inboard side (not shown), or the outboard side as shown in FIG. 3D. As discussed above, the ribs may be formed on an airfoil or other design for producing airflow in and/or around the bridge portion (or entire rotor).

This cross-sectional shape of the rib in any of the embodiments of the present invention may be any shape, but preferably is triangular or trapezoidal.

Figure 4A:
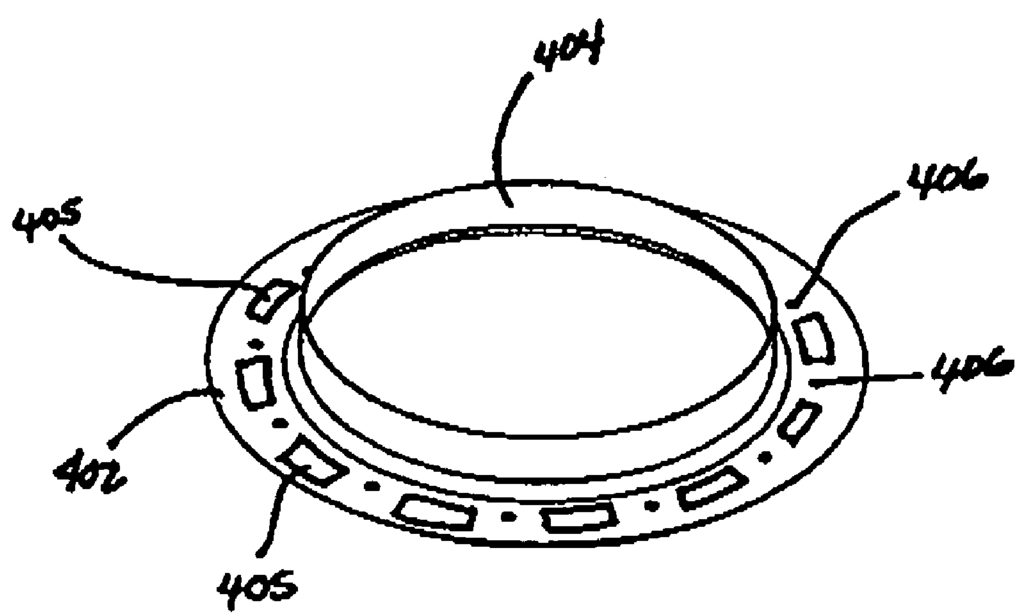
FIG. 4A illustrates a top, perspective view of a cover ring according to still another embodiment of the present invention.
Figure 4B:
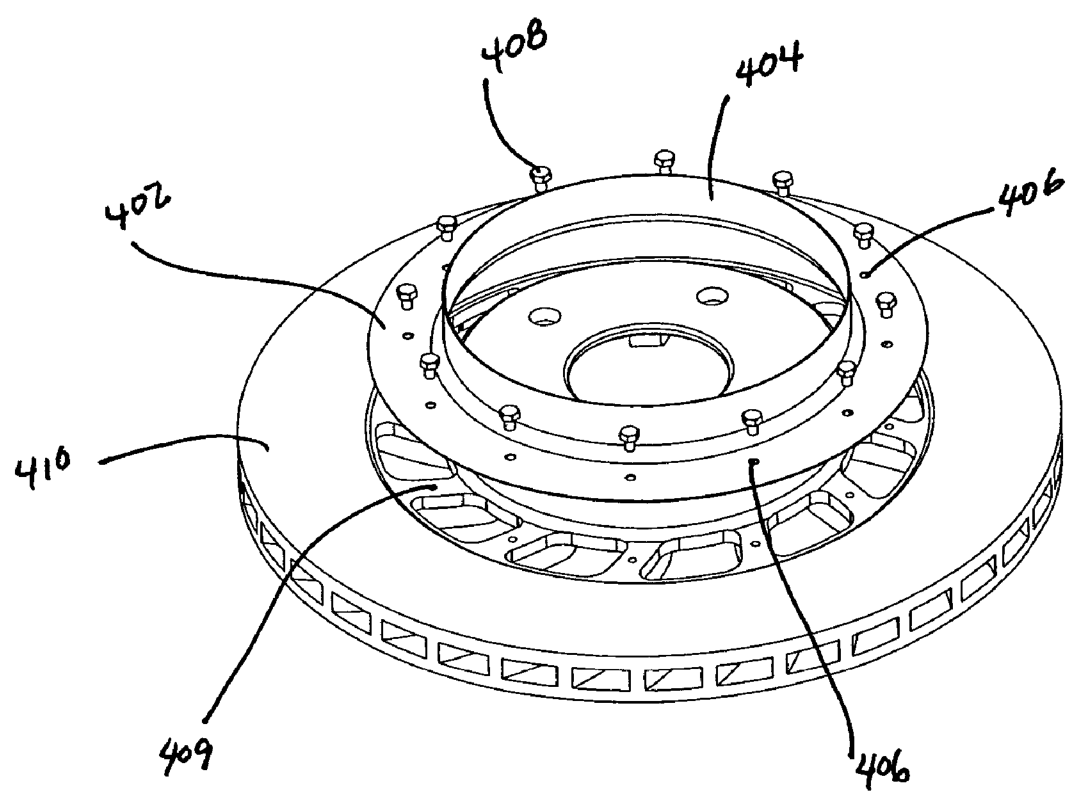
FIG. 4B illustrates an installation of the cover ring of FIG. 4A onto a disc brake rotor.
Figure 4C:
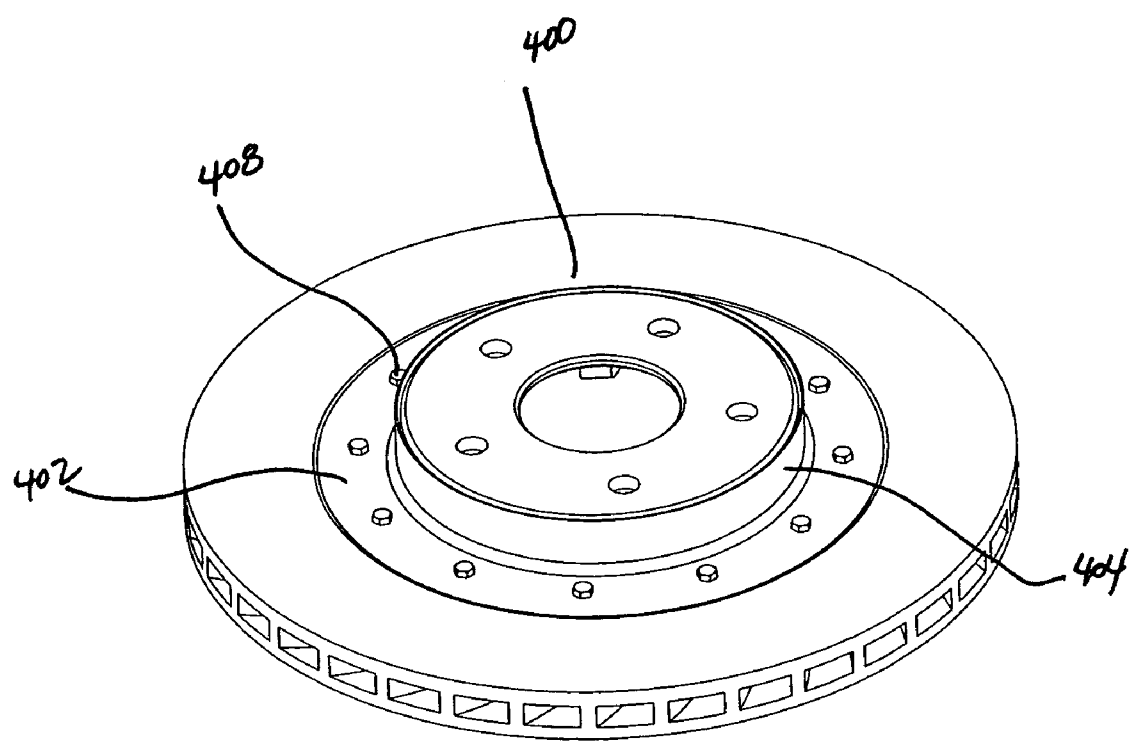
FIG. 4C illustrates a completed installation of the cover ring illustrated in FIGS. 4B and 4C.

In some applications of the present invention, the openings as exposed on the bridge portion of the rotor (with or without ribs) may be covered for either aesthetic or performance issues (or both). Specifically, as shown in FIGS. 4A–4C, a cover plate 400 includes a flange 402 having one or more openings 406. The cover may be made of any conventional material that can withstand the rigors of the braking environment (e.g., alloy metal, high temp synthetic plastics, and the like). Integral ring 404 receives the central mounting portion of the rotor. Accordingly, a plurality of fasteners 408 are received in the plurality of openings 406, to be received by openings 409 of rotor 410. Preferably, the openings 409 are threaded openings to receive fasteners (for example) having threads corresponding thereto. A completed rotor/cover assembly is shown in FIG. 4C.

The cover may be a solid plate without an opening, which may cover the a portion or all of the bridge area. Alternatively, the cover may include openings 405 (see FIG. 4A) to cover one or more portions of the bridge area. In some embodiments of the cover, the cover may be rotated to a desired location relative to the bridge (for example, if the bridge includes openings) to form a desired look, and fastened into positioned.

Other embodiments of the cover may include a protruding fin/airfoil to create airflow in, around and through the bridge portion. Accordingly, such airflow may further keep the braking system at a lower operating temperature (e.g., keeping the rotor from overheating during extended, ongoing use—hard braking), and may also serve to keep brake dust from accumulating in and around the wheel and/or braking system. The fin/airfoil may protrude either toward the inboard or outboard direction of the brake rotor. To that end, if the fin/airfoil is directed toward the inboard side, it may be formed with enough length so as to protrude above the surface of the bridge.

Still other embodiments of the cover may include ornamental/functional features which create a particular aesthetic look to the bridge portion and/or hat of the rotor.

Having now described some of the embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention. The contents of any references cited throughout this application are hereby incorporated by reference. The appropriate components, processes, and methods of those documents may be selected for the present invention and embodiments thereof.

What is claimed is:

1. A brake rotor comprising:

a central mounting portion for mounting the brake rotor on a hub;

a first annular braking surface and a second annular braking surface, wherein each braking surface includes an inner diameter and an outer diameter;

radially extending brake surface reinforcing ribs located between said first and second annular braking surfaces and between inner and outer diameters of the braking surfaces;

a bridge in the form of a radially extending wall completely surrounding said central mounting portion between said central mounting portion and the inner diameter of one of said first and second annular braking surfaces; and a plurality of radially extending bridge reinforcing ribs mounted on said bridge extending from said central mounting portion to said outer diameter of said one of said first and second annular braking surfaces between said radially extending brake reinforcing ribs, wherein the central mounting portion, the braking surfaces, the bridge and the brake reinforcing and bridge reinforcing ribs are formed in a single piece and said brake reinforcing and bridge reinforcing ribs extend into a space between said first and second annular braking surfaces;

a cover for covering all or a portion of the bridge;

wherein the cover comprises a circular piece of material having a central opening corresponding in size to the central mounting portion of the rotor, wherein upon mounting of the cover onto the rotor, the central opening receives the central mounting portion of the rotor;

wherein the cover includes a plurality of fastening openings for receiving fasteners for fastening the cover to the rotor.

2. The brake rotor according to claim 1, wherein said braking surfaces, bridge, and bridge reinforcing ribs are not made of multiple pieces.

3. The brake rotor according to claim 1, wherein either or both of the annular braking surfaces includes one or more slots.

4. The brake rotor according to claim 1, further comprising one or more pairs of openings, each pair of openings allowing communication between the first annular braking surface and the second annular braking surface.

5. The brake rotor according to claim 1, further comprising a hat portion disposed in the central mounting portion and adapted for mounting the rotor to a vehicle.

6. The brake rotor according to claim 1, wherein a first opening allows the first annular surface to fluidly communicate with a vent.

7. The brake rotor according to claim 1, wherein the central mounting portion includes a hat having a plurality of openings for receiving fasteners from a hub or a plurality of fasteners for fastening a wheel to the hub and rotor combination.

8. A brake rotor compromising:

a central mounting portion for mounting the brake rotor onto a hub;

a first annular braking surface and a second annular braking surface, wherein each braking surface includes an inner diameter and an outer diameter;

a plurality of flow channels provided between the first annular braking surface and the second annular braking surface;

a bridge in the form of a radially extending wall completely surrounding and perpendicular to an outer surface of said central mounting portion extending between the central mounting portion and said inner diameter of one of said braking surfaces; and a plurality of radially extending ribs positioned on the bridge and extending into the flow channels between said first and second annular braking surfaces, wherein the central mounting portion, the braking surfaces, the bridge and the ribs are formed in a single piece;

a cover for covering all or a portion of the bridge;

wherein the cover comprises a circular piece of material having a central opening corresponding in size to the central mounting portion of the rotor, wherein upon mounting of the cover onto the rotor, the central opening receives the central mounting portion of the rotor:

wherein the cover includes a plurality of fastening openings for receiving fasteners for fastening the cover to the rotor.

9. The brake rotor according to claim 8, wherein each flow channel includes at least one wall.

10. The brake rotor according to claim 9, wherein the at least one wall comprises one of the plurality of ribs.

11. The brake rotor according to claim 8, further comprising a plurality of openings positioned in the bridge between the ribs.

* * * * *